(12) United States Patent
Marglin

(10) Patent No.: US 6,425,666 B1
(45) Date of Patent: Jul. 30, 2002

(54) FILM DELIVERY AND RECOVERY STABILIZATION SYSTEM

(76) Inventor: Andrew Marglin, 284 Broadway, Huntington Station, NY (US) 11746

( * ) Notice: Subject to any disclaimer, the term of this patent is extended or adjusted under 35 U.S.C. 154(b) by 4 days.

(21) Appl. No.: 09/615,341

(22) Filed: Jul. 12, 2000

(51) Int. Cl.⁷ .......................... G03B 1/00; G03B 21/00; G03B 1/76; G03B 1/04
(52) U.S. Cl. .................. 352/156; 352/128; 352/232; 242/324
(58) Field of Search ............................... 352/124, 125, 352/126, 127, 128, 156, 232; 242/600, 324–358.1

(56) References Cited

U.S. PATENT DOCUMENTS

| | | | |
|---|---|---|---|
| 3,661,337 A | * 5/1972 | Burth | 242/325.2 |
| 3,863,852 A | * 2/1975 | Raclett et al. | 242/325.2 |
| 4,757,958 A | * 7/1988 | Elliott et al. | 242/345.3 |
| 5,873,651 A | * 2/1999 | Hofer et al. | 362/396 |

* cited by examiner

Primary Examiner—Russell Adams
Assistant Examiner—Rodney Fuller
(74) Attorney, Agent, or Firm—Michael I. Kroll

(57) ABSTRACT

Disclosed is a film delivery and recovery stabilization system for platter-type movie projection systems which provides a stratum material for dissipating static charge which accumulates within the film media and a plurality of retaining members selectively positioned at the periphery of a spool of film. The retaining members encasing magnetic elements that magnetically attach to a magnetic material which has been placed in a variable number of radial slots in the static dissipating stratum material.

4 Claims, 10 Drawing Sheets

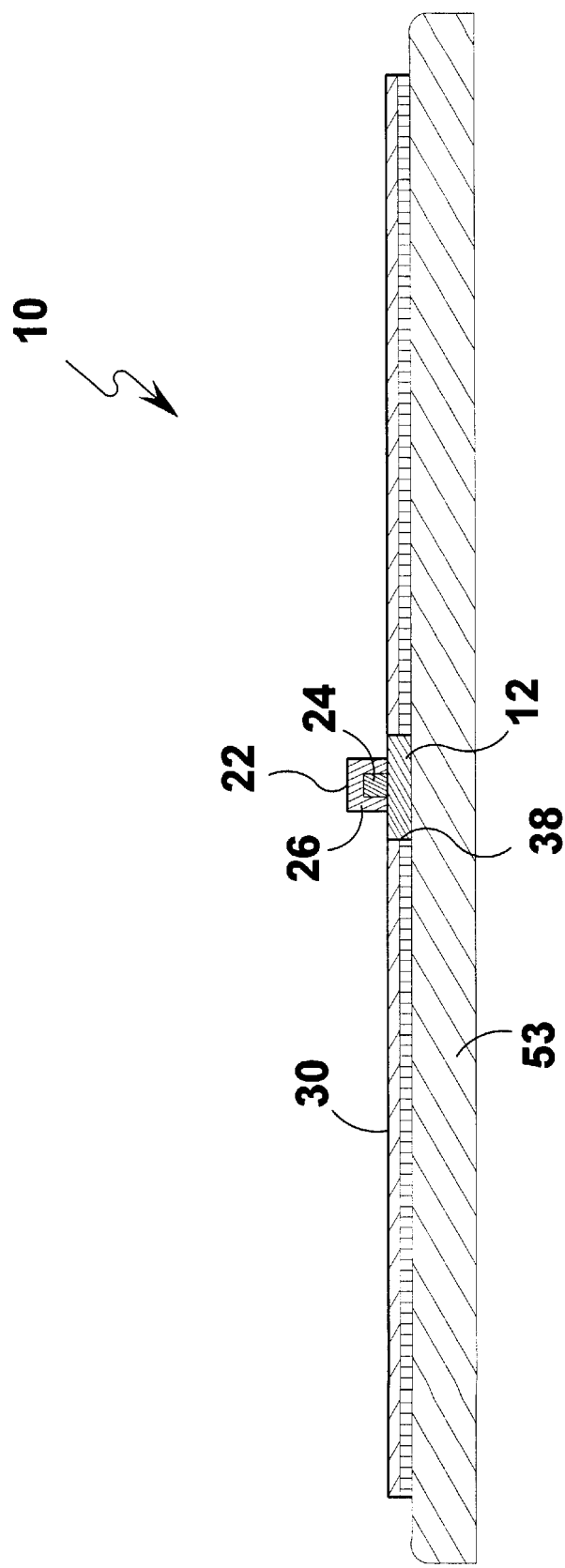

FILM DELIVERY AND RECOVERY STABILIZATION SYSTEM

BACKGROUND OF THE INVENTION

1. Field of the Invention

The present invention relates generally to movie projection systems and, more specifically, to platter-type movie projection systems. The present invention is a plurality of selectively positionable magnetic plates having means for adhering said plates to a platter and a plurality of selectively removable/positionable magnetic keepers.

In addition the present invention provides for an additional element in the form of a stratum material for dissipating static charge that accumulates within the film media.

2. Description of the Prior Art

The most prevalent equipment used in multiplex movie theaters is a projector having a three-tier platter system which uses a first tier to feed film to the projector and a second tier to take up film from the projector and a third tier for loading new prints. The three-tier platter system is comprised of a stanchion having arms supporting large aluminum disks (platters) with each disk having a motor for independently rotating the disk.

When a movie theater receives a movie print, it comes in a plurality of shipping canisters each having about 18 minutes of film per shipping canister dependant on the type of film media. For economic reason, the movie industry moved from a triacetate film to polyethylene terephthalate commonly referred to as polyester film, which has superior strength and tear characteristics.

The film is removed from the shipping canisters and wound onto a single platter. Each canister end piece being spliced to the next canister beginning piece until all canisters have been wound onto a single platter.

In the center of each platter is a bore wherein is mounted a different device depending on the purpose of the platter. While the film is being loaded onto a platter, a compressible ring serves as a spool. When it is time to run the film, the collapsible ring is compressed, removed and another device consisting of a plurality of rollers having electrical connection to the platter motor is inserted into the bore. This device will control the rotation of the platter as the film is feed from the center of the platter to the projector and another motor controls the print take-up platter.

While this system has functioned well for many years the move from triacetate film to polyester film has developed a number of problems which plague movie houses.

The polyester film accumulates a static charge from the aluminum platter as it is being loaded onto the platter. Once the film is feed to the projector, the static charge between the layers of film causes the film to cling to itself resisting removal.

Included with the aforementioned roller assembly is a servo arm that has the film threaded therethrough and controls the platter rotation by causing platter rotation as the film tensions the servo arm. The point of separation of the film from the remaining film, which should be diametrically opposed to the servo arm, starts to lag behind its optimal release point until it binds and the movie is halted. Another problem with the polyester film is that it is almost half the thickness of triacetate film. As the movie nears the last half-hour, the platter is left with a large thin doughnut of film that has a tendency to oscillate as the platter is rotating and has been known to fall off the platter. Again abruptly ending the movie.

The industry has addressed this problem by attaching suction cups about the periphery of the film prior to running the film but these suction cups have been known to fall off from the rotating platter probably due to the pressure placed on them by the film.

Another method is to use a temporary adhesive to hold retaining members in place but this requires cleaning the platter between uses.

While these systems and devices may be suitable for the particular purpose to which they address, they would not be as suitable for the purposes of the present invention as heretofore described.

Therefore it is felt that a need exists for the present invention which will eliminate the static charge of the polyester film by placing a static dissipating stratum to the aluminum platter. Furthermore, the circumference of the film can be fixed by cutting radial slots into the static dissipating stratum and placing a magnetic material therein whereby film retaining members having magnets, which will not adhere to the aluminum, encased therein that can be selectively positioned at the periphery of the film. The number of said radial slots can be as few as three and is a variable of personal preference.

The magnetic material can be permanently affixed to the aluminum platter or removably attached by any means known within the art such as adhesively.

SUMMARY OF THE PRESENT INVENTION

The present invention is a stratum material for dissipating static charge that accumulates within the film media and a plurality of retaining members selectively positioned at the periphery of a spool of film. Said retaining members encasing magnetic elements that magnetically attach to a magnetic material which has been placed in a variable number of radial slots in the static dissipating stratum material.

A primary object of the present invention is to provide a film delivery and recovery system that will overcome the shortcomings of prior art devices.

Another object of the present invention is to provide a film delivery and recovery system having an anti-static stratum substantially covering the top surface of the platter.

Yet another object of the present invention is to provide a film delivery and recovery system having an anti-static stratum substantially covering the top surface of the platter having a plurality of radial slots cut therein.

Still yet another object of the present invention is to provide a film delivery and recovery system having an anti-static stratum substantially covering the top surface of the platter having a plurality of radial slots cut therein having a magnetic material positioned within said slots.

A further object of the present invention is to provide a film delivery and recovery system having an anti-static stratum substantially covering the top surface of the platter having a plurality of radial slots cut therein having a magnetic material positioned within said slots having retaining film members magnetically attached thereto.

A still further object of the present invention is to provide a film delivery and recovery system having magnetic film print retaining members which can be selectively attached or removed from said magnetic material.

Another object of the present invention is to provide a film delivery and recovery system having magnetic film print retaining members which can be selectively positioned at the periphery of the film print to keep the print from oscillating on the platter.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 1 is an illustrative view of a typical three-tier platter system having the present invention installed thereon. Shown is a first platter having an anti-static stratum material positioned between the aluminum platter and the film print. Also shown are a plurality of slots within said stratum wherein is positioned a magnetic material. Further shown are film retaining members magnetically positioned on said magnetic material at the periphery of the film print.

FIG. 2 is an exploded view of the present invention positioned over a film platter. Shown is the anti-static stratum material having a plurality of radially slots placed therein. Also shown are a plurality of magnetic material conforming substantially to the anti-static radially slots and a plurality of film retaining member having magnets elements encased therein.

FIG. 3 is a perspective view of a platter having the anti-static stratum material positioned thereon. Also shown is a magnetic material conforming substantially to the radial slots within said anti-static stratum. The magnetic material can be fixedly attached to the platter by an adhesive layer having a peelably removable covering. The magnetic film retaining elements having magnets encased therein can be selectively positioned anywhere on the magnetic material.

FIG. 4 is a perspective view of the present invention installed on a platter having a spool of film print positioned thereon. Shown is the film leader positioned over the platter bore wherein will be placed a roller-like device for feeding the film print to the projector. Also shown are film retaining members magnetically position at the periphery of the film.

FIG. 11 is a cross section view taken from FIG. 7 of an aluminum platter having electrically conductive material positioned thereon with a magnetic plate, of substantially similar thickness, positioned in a throughbore of the electrically conductive material, providing means for selectively attaching a film retaining magnetic keeper to the magnetic plate.

DETAILED DESCRIPTION OF THE PREFERRED EMBODIMENT

Figure 1:
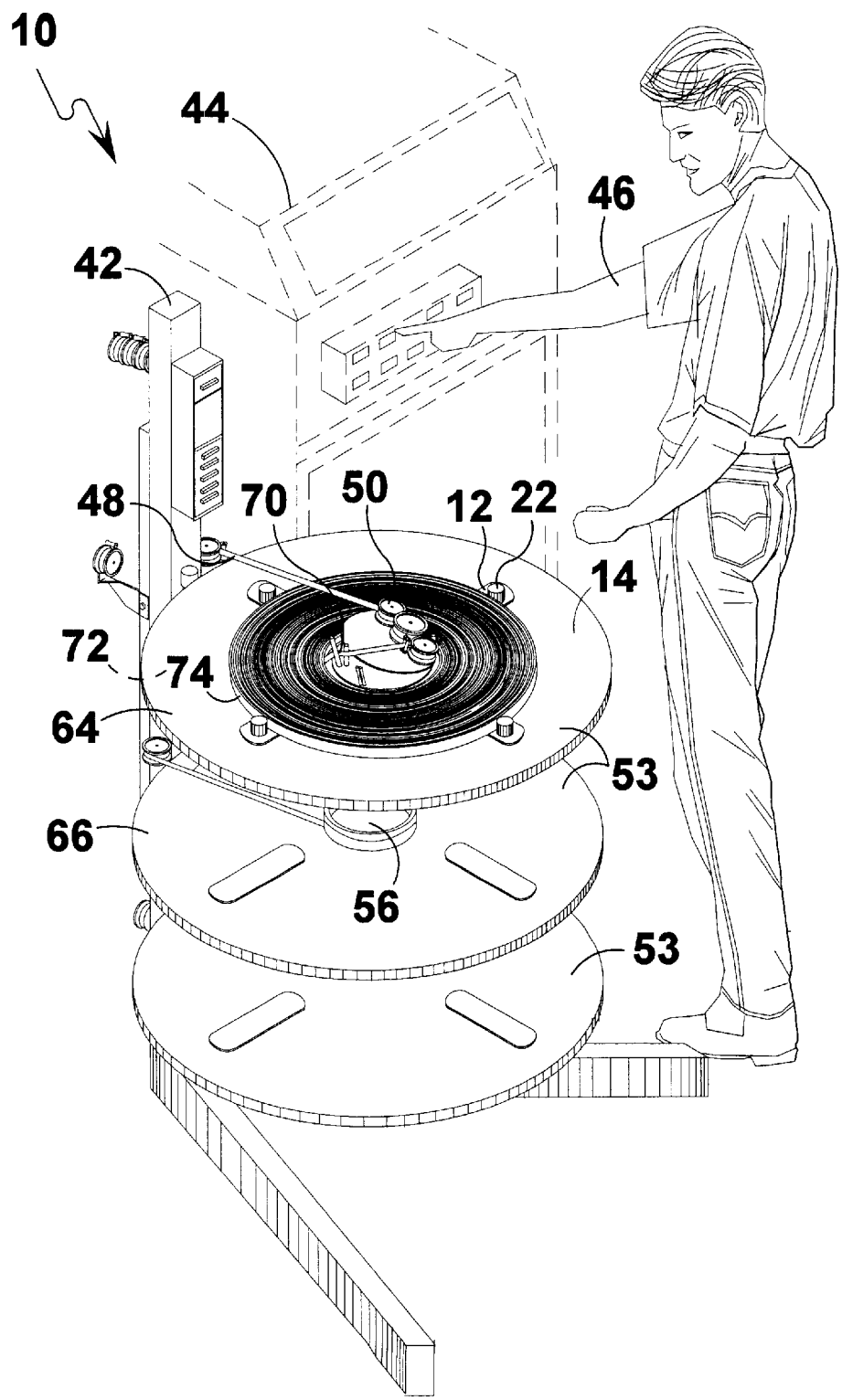

Turning now descriptively to the drawings in which similar reference characters denote similar elements throughout the drawing figures. FIG. 1 through FIG. 11 illustrates the film recovery and stabilization system of the present invention indicated generally by the numeral 10.

Referring to FIG. 1 the three-tier platter system (42) supplies a film print (48) to projector (44) initiated by operator (46). The three-tier platter system (42) is comprised of a number of platters (53), which serve to feed projector (44). The three-tier platter system (42) is comprised of first platter/print feed platter (64) having a film print feed roller device (50) removing film print (48) to projector (44). Film print feed roller device (50) has a servo arm (70) having electrical connection to hidden platter motor (72) for controlling the rotation of platter (64). Upon exiting projector (44), film print (48) is fed through the three-tier platter system (42) to a second aluminum platter/print take-up platter (66). Fixedly attached to platter surface (54) is a plurality of magnetic plates (12) which provide a platform for selectively attaching magnetic keepers (22). Magnetic keepers (22), as shown, selectively positioned on magnetic plates (12) of the first platter/print feed platter (64) are positioned at the periphery edge (74) of film print (48) for maintaining the positioning of film print (48) on first platter/print feed platter (64).

As film print (48) is fed through film print feed roller device (50), servo arm (70) responds to tensioning on film print (48) caused by projector (44) having mechanical means for drawing film print (48) at a specific frames per minute through the projector optics. Servo arm (70) responds to said tensioning by engaging platter motor (72) to rotate first platter/print feed platter (64).

As film print (48) is fed through film print feed roller device (50), servo arm (70) responds to tensioning on film print (48) caused by projector (44) having mechanical means for drawing film print (12) at a specific frames per minute through the projector optics. Servo arm (70) responds to said tensioning by engaging platter motor (72) to rotate first platter/print feed platter (64).

Figure 2:
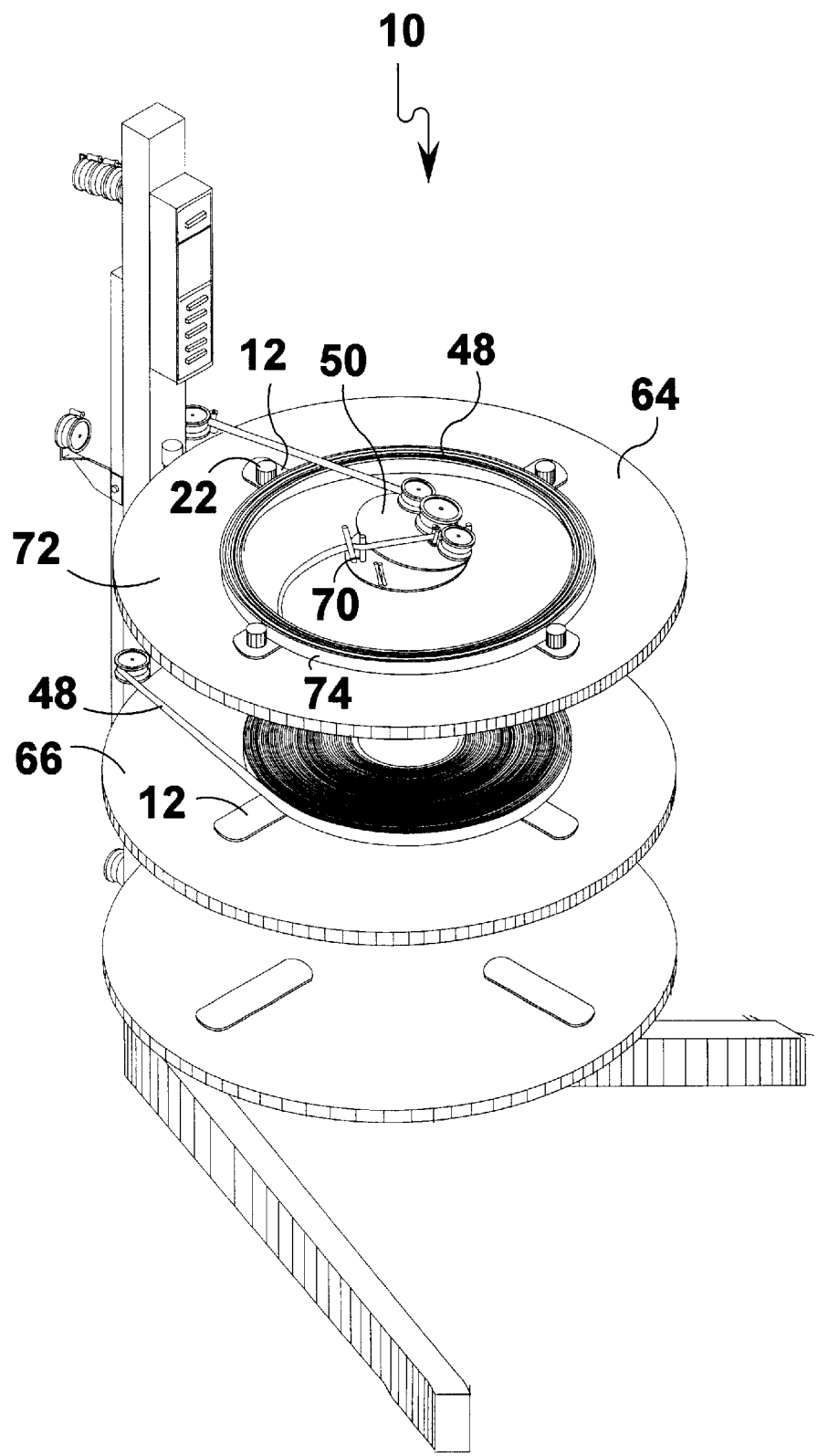

Referring to FIG. 2, as film print (48) reaches the end of the movie, film print (48) resembles a large doughnut-like shape, as shown. The remainder of film print (48) has a tendency to oscillate as servo arm (70) of film print roller device (50) causes first platter/print feed platter (64) by means of platter motor (72) to rotate. The magnetic keepers (22) on magnetic plates (12) that were selectively positioned at the periphery wall (74) of film print (48) will prevent any movement of the aforementioned doughnut-like film print remnant located on first platter/print feed platter (64). Also shown, the second aluminum platter/print take-up platter (66) receives the film print (48) from projector (44). Magnetic plates (12) being of millimeter thickness do not impede the spooling of the film print (48).

Figure 3:
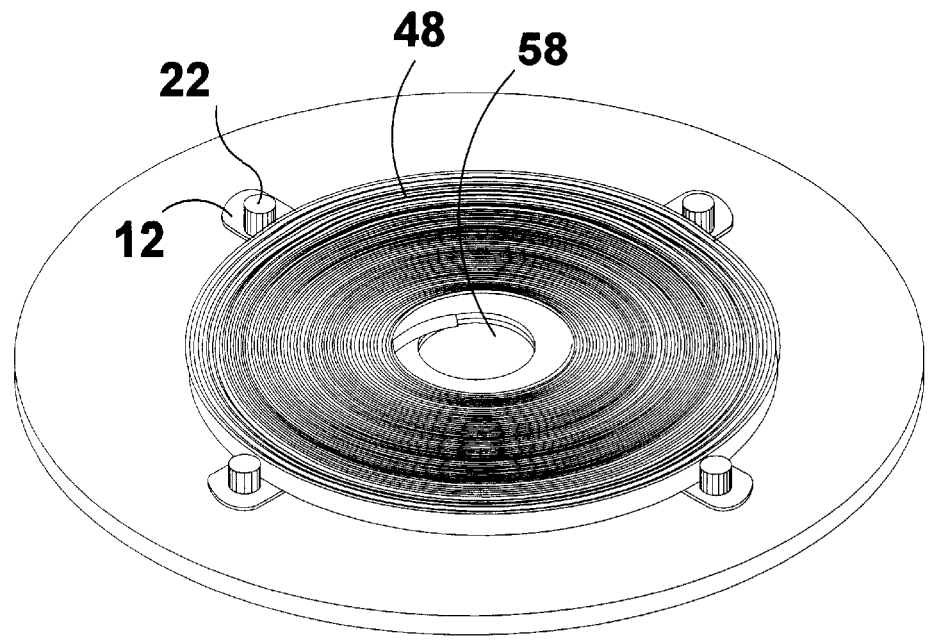

Referring to FIG. 3, the film print (48) having been spooled onto second aluminum platter/print take-up platter has a plurality of magnetic keepers (22) selectively positioned onto magnetic plates (12). The film print compression spool device has been removed from the platter bore (58).

Figure 4:
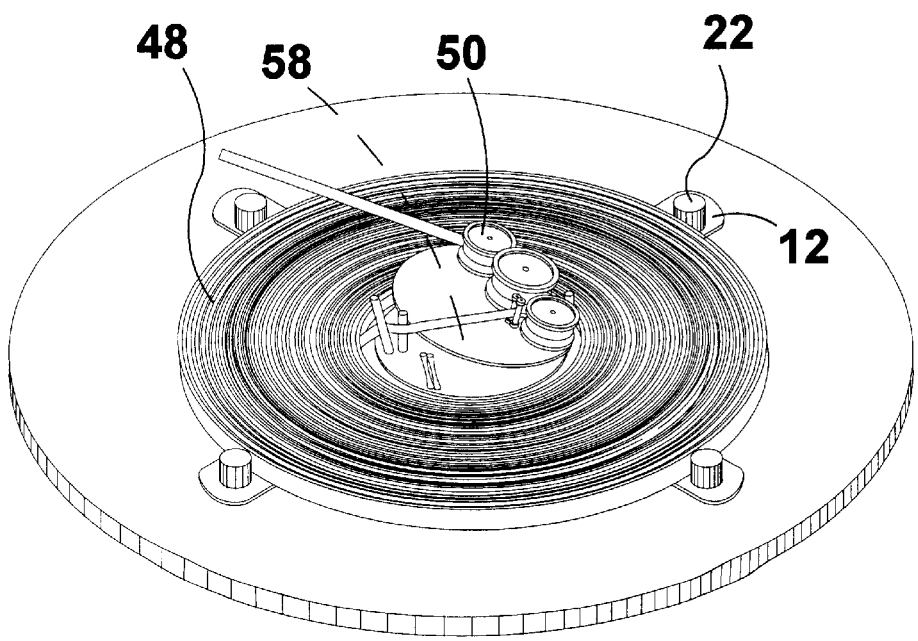

Referring to FIG. 4, shows the film print (48) having magnetic keepers (22) magnetically fixed to the magnetic plates (12). Once the film print feed roller device (50) is positioned with the platter bore (58), the film print (48) is fed therethrough and ultimately to the projector (44).

Figure 5:
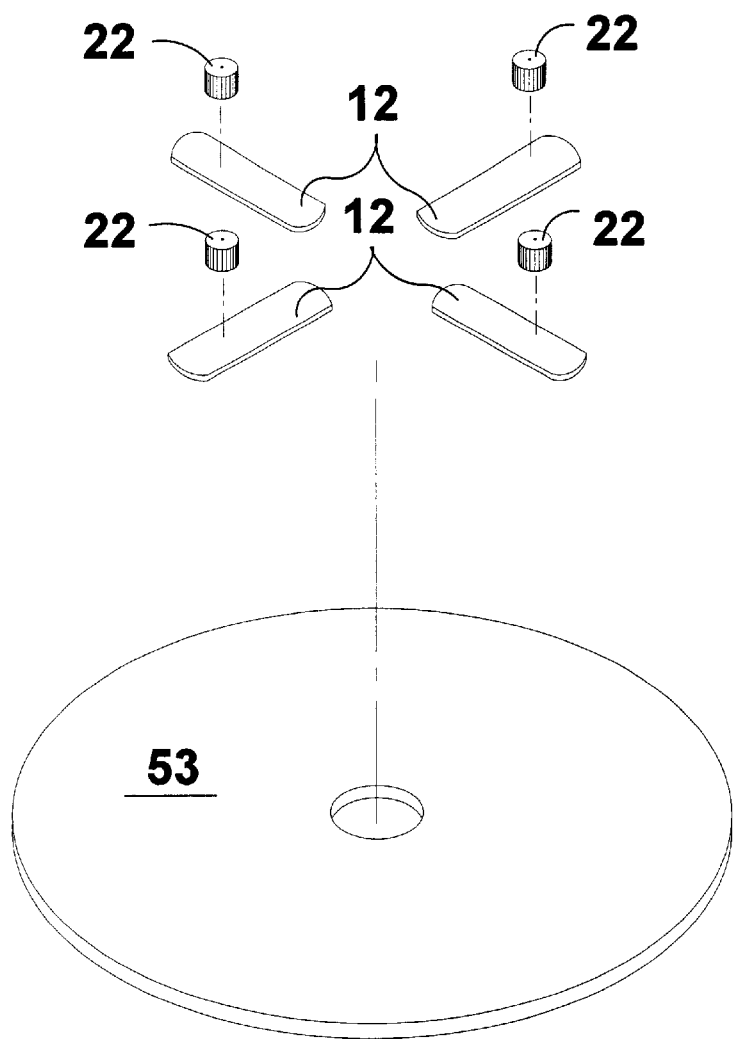
FIG. 5 is a perspective view of a typical three-tier platter system having the present invention installed thereon.

Referring to FIG. 5, is an exploded view of platter (53) having a plurality of magnetic plates (12) ready to be fixedly positioned thereon. The magnetic keepers (22) will be selectively positioned onto the magnetic plates.

Figure 6:
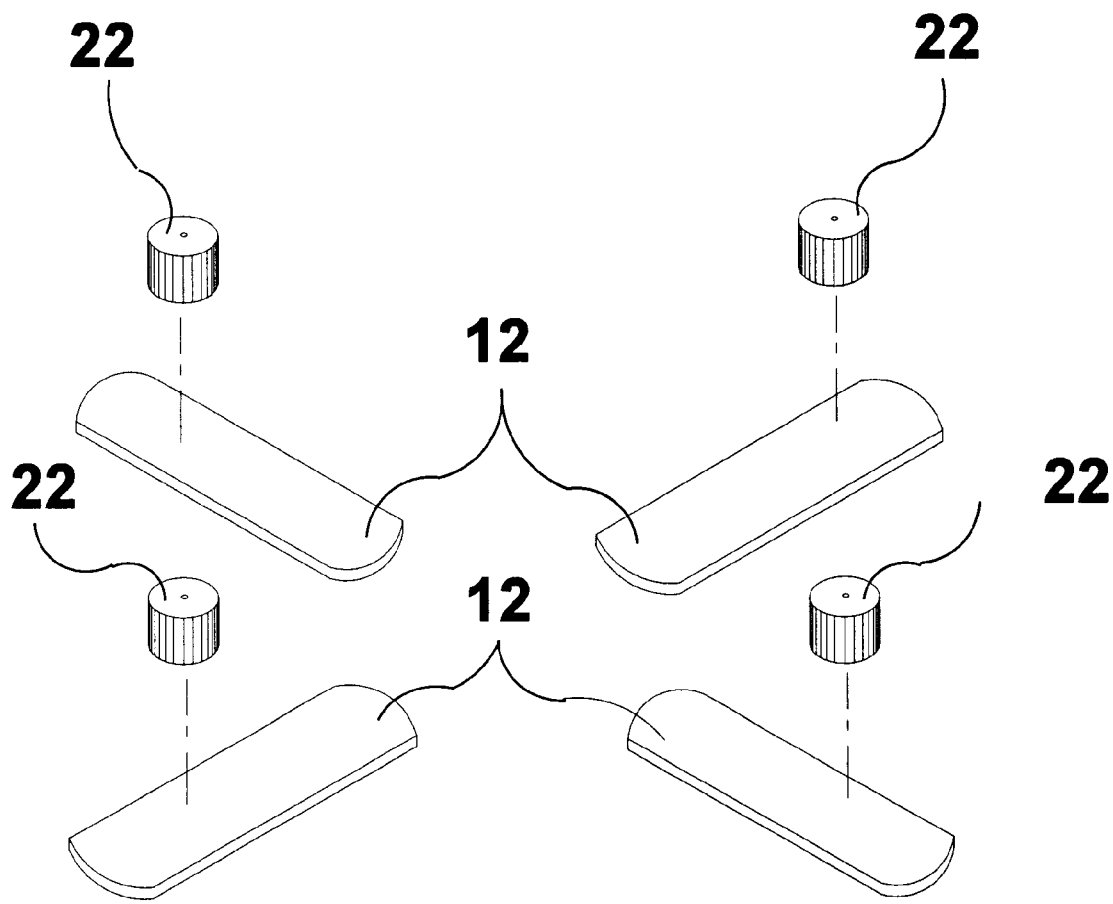
FIG. 6 is a cross sectional view of a platter having the present invention installed thereon.

Referring to FIG. 6, shows the magnetic plates (12) that are manufactured from a magnetic material and are of sufficient length as to accommodate any length of film print (48). Whereupon the magnetic plates (12) form an anchoring position for the magnetic keepers (22) whereby the magnetic keepers (22) can be selectively positioned at the periphery wall of the film print (74).

Figure 7:
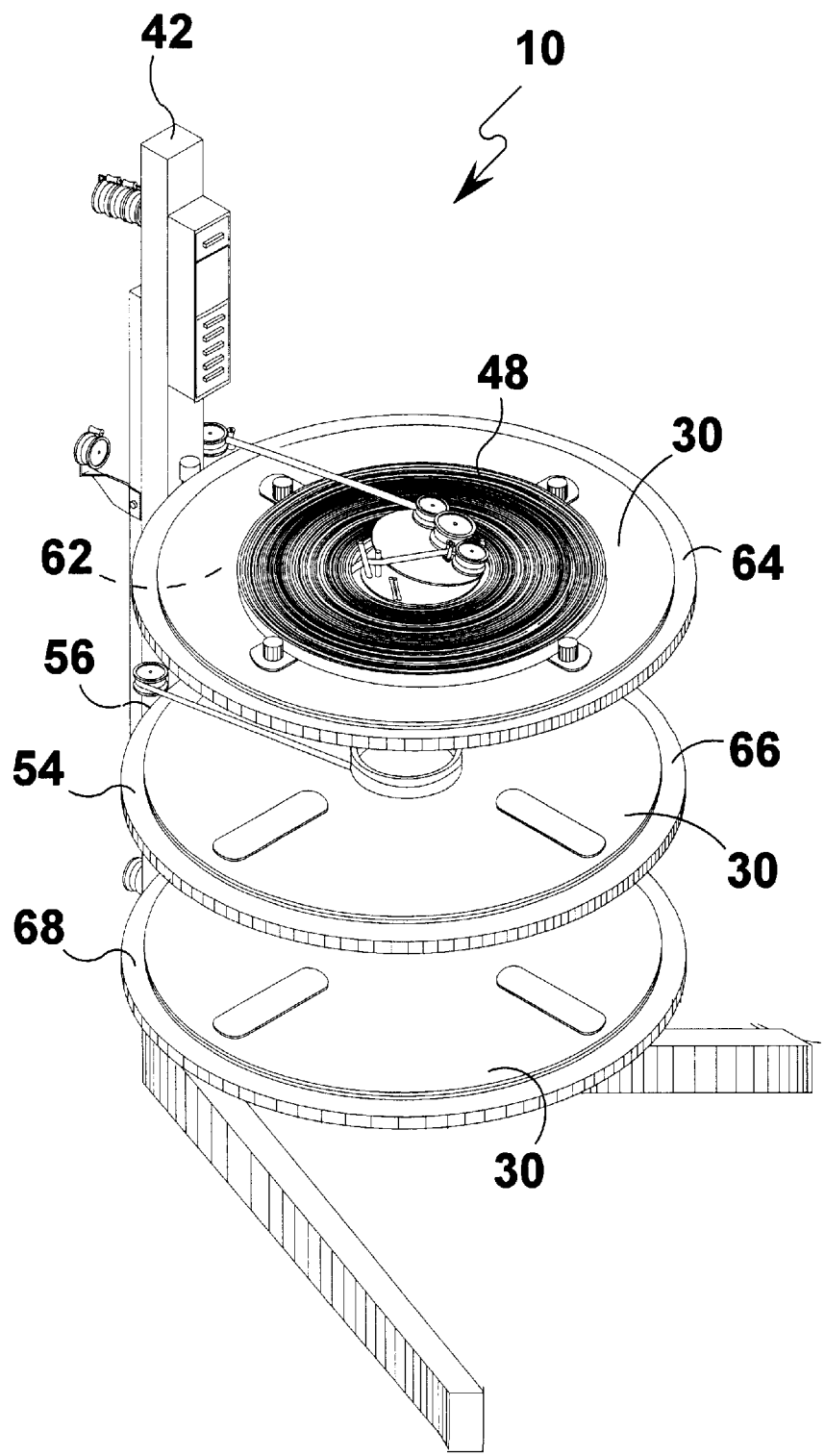
FIG. 7 shows an exploded view of the three tier platter system.

Referring to FIG. 7, shows the three-tier platter system (42) having an additional element in the form of an electrically conductive stratum material (30) positioned between first platter/print feed platter (64) and film print (48). Also shown, is another electrically conductive stratum material (30) positioned between second aluminum platter/print take-up platter (66) and film print (48). Another electrically conductive stratum material (30) is positioned on the third aluminum platter (68). The third aluminum platter (68) provides means for mounting another film print (48) onto the three tier platter system (42). The polyester film print (48) has a tendency to collect a static charge from coming into contact with the periphery platter surface (56) and top platter surface (54). The electrically conductive stratum material (30) will draw the static charge from the film print (48) and dissipate that charge through some grounding mechanism positioned on the bottom platter surface (62).

Figure 8:
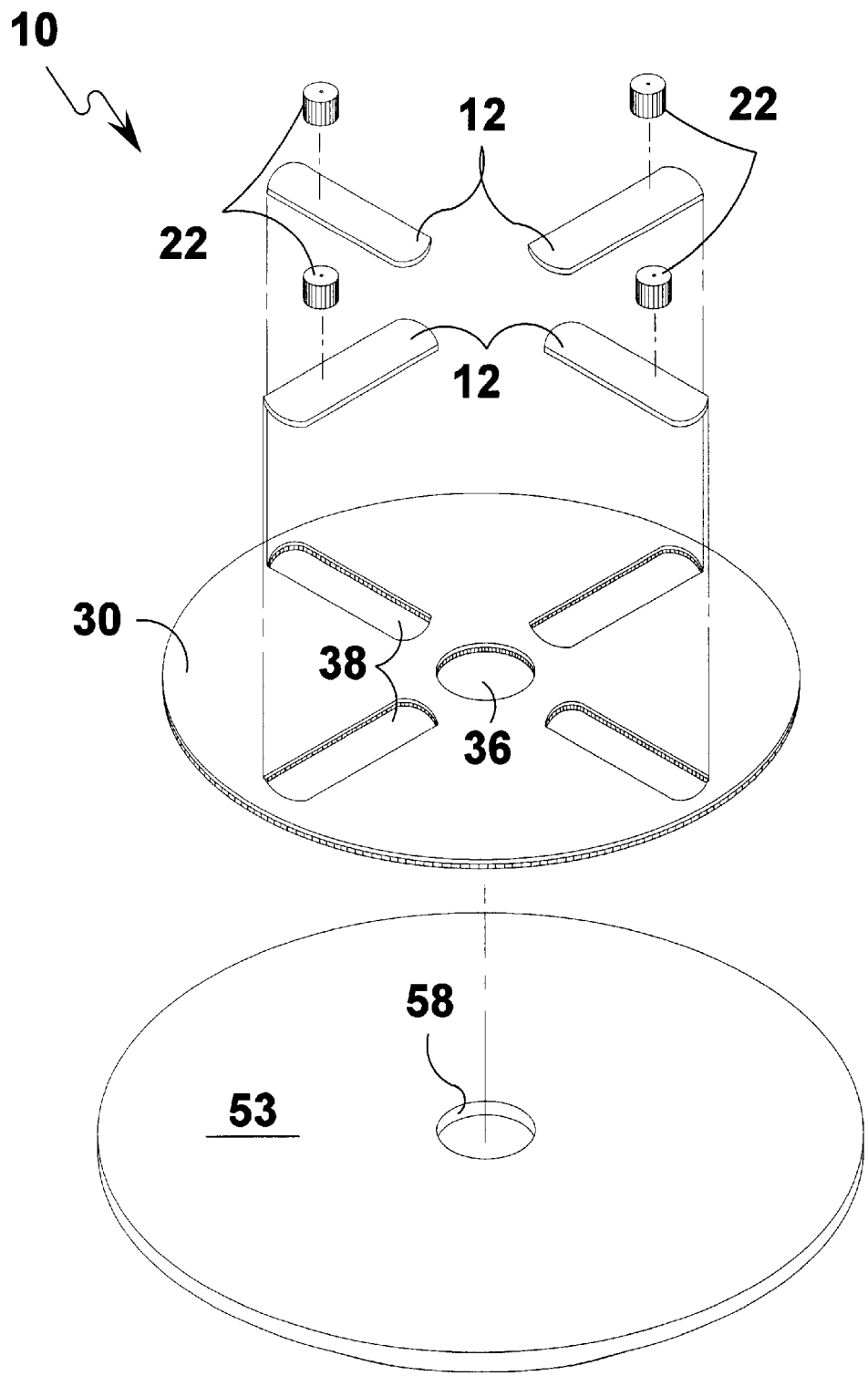
FIG. 8 is a perspective exploded view of the present invention and an aluminum platter that is used as a film distribution and recovery platform.

Referring to FIG. 8, shows an exploded view of the preferred embodiment of the present invention having the electrically conductive stratum material (30). The electrically conductive stratum material (30) has a plurality of radial slots cut therein, wherein an equal number of magnetic plates (12) and selectively positionable/removable magnetic keepers (22) positioned thereon for the purposes of fixedly positioning the electrically conductive stratum material (30) to the aluminum platter. The electrically conductive stratum material also has a centrally positioned bore being of substantially similar size as the platter bore (58).

Figure 9:
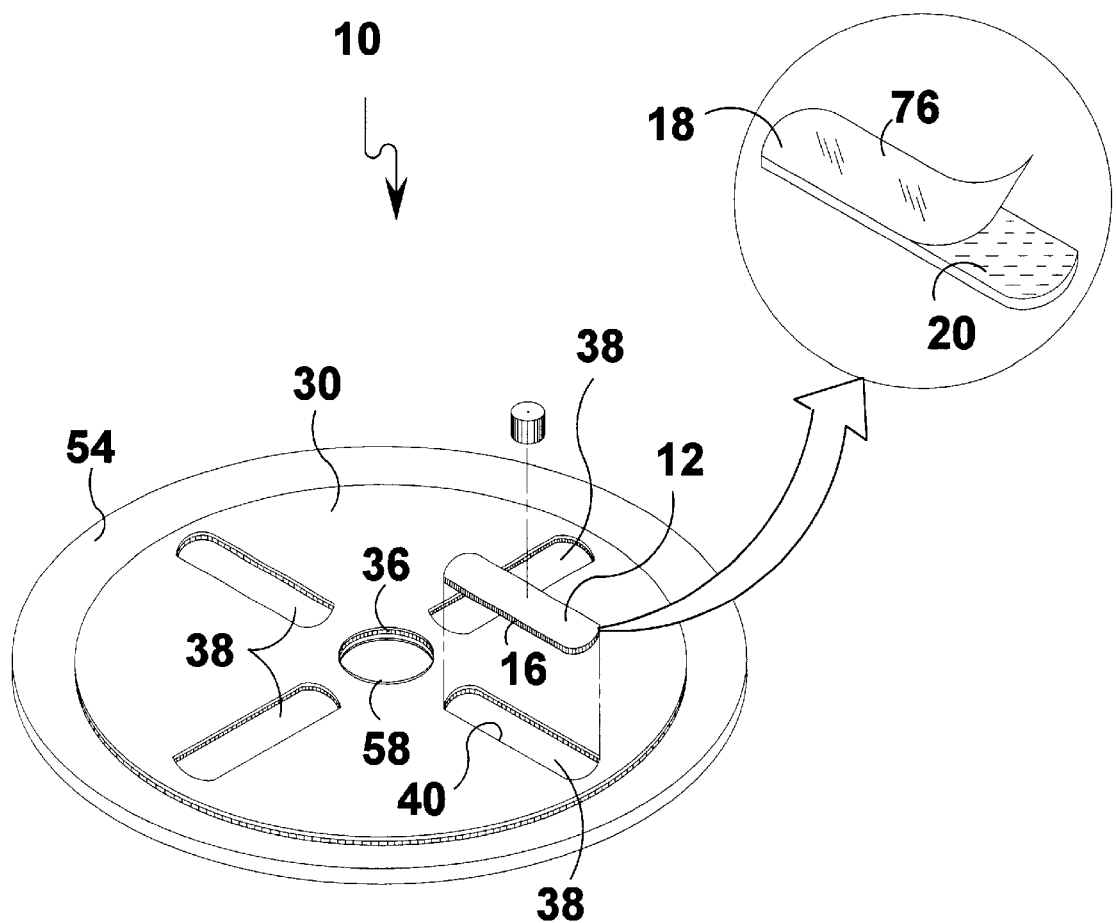
FIG. 9 is a perspective view showing the electrically conductive material positioned on a platter having a plurality of slots for the placement therein of magnetic plates that provide means for attachment of film retaining magnetic keeper. As shown the magnetic plates may have a bonding agent on the platter engaging surface.

Referring to FIG. 9, shows the electrically conductive stratum material (30) positioned on the top platter surface (54) having the stratum bore (36) aligned with the platter bore (58). The electrically conductive stratum material (30) is held in place on the top platter surface by the magnetic plates (12). The magnetic plates (12) and stratum magnetic plate apertures (38) are substantially of similar size whereby stratum magnetic plate aperture wall (40) and magnetic plate periphery wall (16) mate. The magnetic plate bottom surface (18) has an adhesive material (20) which is exposed by removing a cover sheet (76). The magnetic plate adhesion material (20) will bond with the platter (53) thereby keeping the electrically conductive stratum material (30) from shifting.

Figure 10:
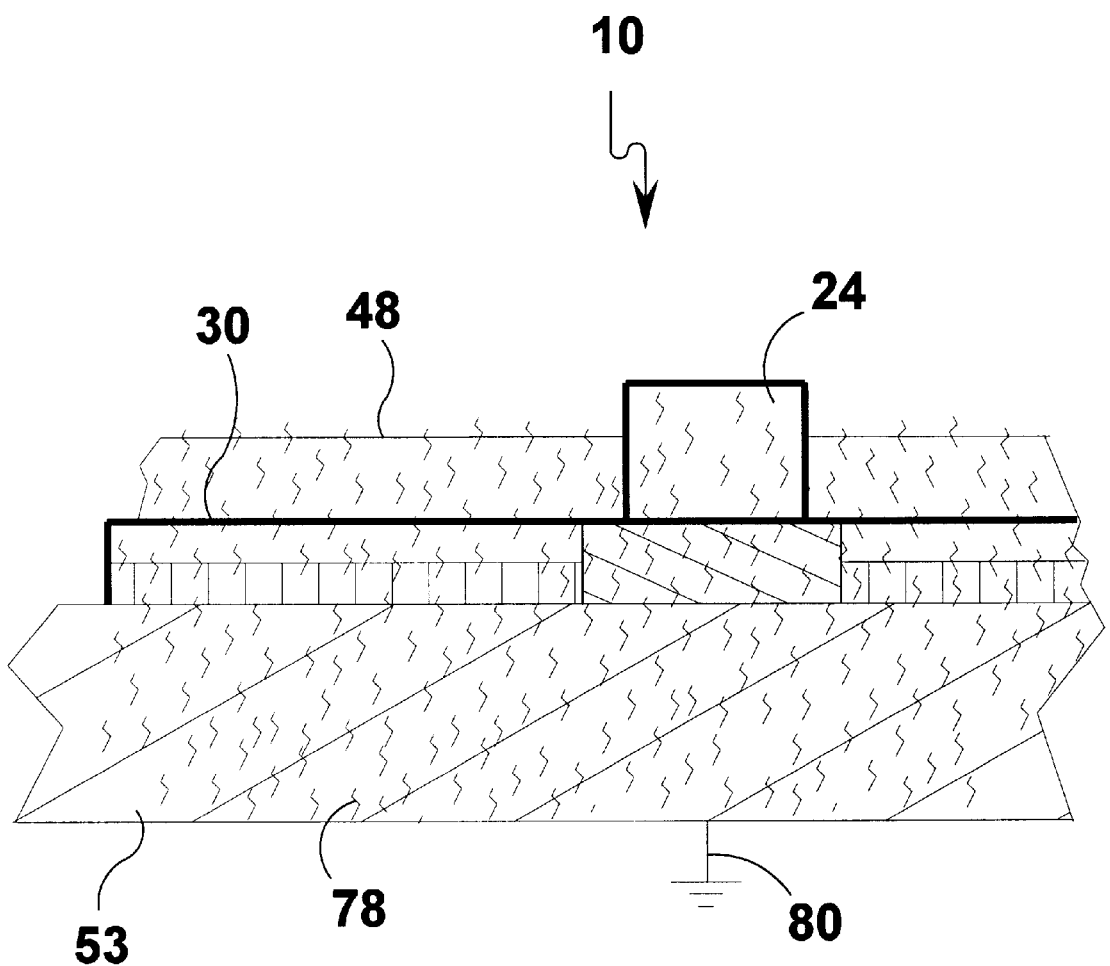
FIG. 10 is an illustrative view of the present invention positioned on an aluminum platter. Shown is the film having a static charge being dissipated through the electrically conductive material to ground.

Referring to FIG. 10, shows an illustrative view of the platter (53) having electrically conductive stratum material (30) positioned thereon. The electrically conductive stratum material is comprised of an upper film print (48) contact surface and an electrically conductive bottom surface which draws the static charge (78) from the film print (48) to the Platter (53) grounding mechanism (80).

Referring to FIG. 11, shows a cross sectional view, taken from FIG. 7 as indicated showing the platter (53) having a magnetic plate (12) adhesively fixed within the stratum magnetic plate aperture. Also shown, magnetically attached to the magnetic plate (12) is magnetic keeper (22). Magnetic keeper (22) is comprised of a magnetic keeper housing (26) and magnet (24).

What is claimed is new and desired to be protected by Letters Patent is set forth in the appended claims:

1. A system for improving the delivery and retrieval of a film print between a film print platter system and a film print projector, the system comprising;
   a) means for dissipating a static charge from a film print to an aluminum platter grounding mechanism comprising an anti-static material between said film print and said platter; and
   b) means for preventing a film print from oscillating on an aluminum platter during a film print showing comprising a plurality of magnetic plates attached to said platter through said anti-static stratum material for holding said anti-static material in place and selectively positionable magnetic keepers on said magnetic plates positioned at a peripheral edge of said film print for maintaining the positioning of said film print on said platter.

2. The system of claim 1, wherein said magnetic plates are adhesively bonded to said aluminum platter.

3. A device for maintaining the positioning of a film print on an aluminum film print platter during a film show comprising a plurality of elongated magnetic plates radially distributed on said platter and a movable magnetic keeper on each of said plates for preventing movement of said film print at the periphery of said film print.

4. The device of claim 3, wherein said magnetic plates are adhesively attached to said platter.

* * * * *